United States Patent Office 3,234,290
Patented Feb. 8, 1966

3,234,290
STABILIZED PHENOLS
Albert L. Rocklin, Walnut Creek, Calif., assignor to Shell Oil Company, New York, N.Y., a corporation of Delaware
No Drawing. Filed Sept. 21, 1961, Ser. No. 139,596
12 Claims. (Cl. 260—624)

This invention relates to stabilized hindered phenols. More particularly, the invention relates to stabilized compositions comprising a hindered phenol and to the process for preparing such stabilized compositions.

The hindered phenols, wherein at least one of the hydrogen atoms ortho to the phenolic hydroxyl group is replaced by a hydrocarbon radical, are normally light-colored compounds having negligible or mild odor when freshly prepared. However, many of these compounds acquire a definite discoloration when allowed to stand and may at the same time develop a strong and disagreeable odor. This deterioration in quality is particularly apparent in the 2,6-dialkylated phenols, many of which are employed as oxidation inhibitors in foods and other materials where it is important that there be no change in the appearance or odor of the resulting composition.

It is an object of the present invention to provide hindered phenol compositions stable against discoloration and development of undesirable odors. Another object of the invention is the provision of a method for preparing such stabilized hindered phenol compositions. Still another object is the provision of a method for crystallizing hindered phenols from solution, while a method for providing such crystallized stabilized hindered phenols is still another object. Crystallized 2,6-dialkyl-4-substituted phenol compositions stabilized against degradation are a particular object of the invention. Other objects will be apparent from the following detailed description of the invention.

These objects are accomplished in the invention by the stabilized composition comprising essentially a solid hindered phenol containing an amount of urea sufficient to stabilize the phenol against discoloration.

The hindered phenols which are stabilized by the process of the invention are those solid hydroxyaryl compounds wherein the phenol has a large branched group ortho to the hydroxyl group, said branched group interfering with the activity of the hydroxyl group to such an extent that the phenols in general behave more like ethers than phenols. These compounds are also sometimes termed "cryptophenols" because the large adjacent substituent or substituents tend to sterically hide the phenolic hydroxyl group. The general class of phenols may be represented by the structural formula

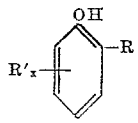

where R is selected from the group consisting of alkyl radicals branched on the alpha carbon atom and hydroxybenzyl groups; R' is selected from the group consisting of the hydrogen atom, alkyl radicals, hydroxyalkyl radicals, hydroxyaralkyl radicals, hydroxyaryl radicals, and hydroxyaralkyloxy radicals; and $x$ is an integer from 0 to 2. In these compounds, preferred alkyl radicals are those having up to 8 carbon atoms.

Representative of compounds where at least one of the substituents is alkyl are such compounds as 2-methyl-6-isopropylphenol; 2-ethyl-6-tert-butylphenol; 2-isopropyl-6-tert-amylphenol; 2,6-di-tert-butylphenol; 2,6-diisopropylphenol; 2,6-di-tert-amylphenol; and 2,6-di-tert-octylphenol. Other alkylated phenols include 2,6-di-tert-butyl-4-isopropylphenol; 2,6-diisopropyl-4-ethyl-phenol; and 2,4,6-tri-tert-butylphenol. Particularly effective as antioxidants and, therefore, preferred as hindered phenols for the compositions of the invention, are those phenols where each of the two ortho and one para carbon atoms on the phenol ring is substituted with an alkyl group, and each of the ortho alkyl groups is branched on the alpha carbon atom. Of these, the most preferred embodiment is 2,6-di-tert-butyl-4-methylphenol, one of the most effective hindered phenols of commerce.

The corresponding phenols wherein at least one R' is a hydroxyalkyl radical, preferably hydroxymethyl, are also effectively stabilized in the compositions of the invention. Illustrative of such compounds are the 2,6-dialkyl-4-hydroxyalkylphenols, typified by 2,6-diisopropyl-4-hydroxymethylphenol; 2,6-di-tert-amyl-4-hydroxyethylphenol; 2,6-di-tert-hexyl-4-hydroxypropylphenol; 2-isopropyl-6-tert-amyl-4-hydroxymethylphenol; and 2-methyl-6-tert-butyl-4-hydroxymethylphenol. Preferred phenols of this type are those wherein each of the ortho-alkyl groups has up to 8 carbon atoms, at least one of the alkyl groups is branched on the alpha carbon atoms, and the hydroxyalkyl para substituent is a hydroxymethyl radical. Most preferred of this class of compounds is 2,6-di-tert-butyl-4-hydroxymethylphenol.

Still another class of phenols which may be employed in the process of the invention are those of the structure

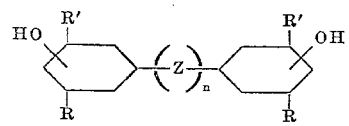

where each R and R' has the above significance, preferably alkyl; Z is a divalent radical selected from alkylidene and sulfur radicals; and $n$ is an integer from 0 to 1.

When $n$ is 0, typical compounds are the 4,4'-dihydroxy-3,3',5,5'-tetraalkyl biphenols, such as 4,4'-dihydroxy-3,3',5,5'-tetraisopropyl biphenol; 4,4'-dihydroxy-3,5-diisopropyl-3',5'-di-tert-butyl biphenol; and 4,4',3,3',5,5'-tetra-tert-butyl biphenol.

When Z is alkylidene, preferably having up to 3 carbon atoms, typical compounds include bis(2-hydroxy-3-tert-butyl-5-methylphenyl)methane; bis(4-hydroxy-3,5-diisopropylphenyl)ethane; 2,2-bis(4-hydroxy-3,5-di-tert-butylphenyl)propane. Of this class of compounds, the most preferred, because it is the best antioxidant, is bis(4-hydroxy-3,5-di-tert-butylphenyl)methane. When Z is sulfur, the compounds are the corresponding sulfides, e.g., bis(4-hydroxy-3,5-di-tert-butyl)sulfide.

Of these bisphenolic compounds, yet another class of the compounds which may be employed in the invention are those of the structure

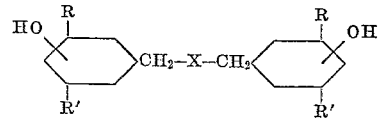

where each R and R' has the above significance, preferably being alkyl of up to 8 carbon atoms, and X is selected from the group consisting of sulfur, oxygen and mononuclear arylene.

Thus, typical oxy compounds are represented by bis(4-hydroxy-3,5-diisopropylbenzyl)ether; bis(2-hydroxy-3,5-di-tert-butylbenzyl)ether; and bis(4-hydroxy-3,5-di-tert-amylbenzyl)ether. Most preferred of these compounds is bis(4-hydoxy-3,5-di-tert-butylbenzyl)ether. Corresponding sulfides where X is sulfur are exemplified by bis(4-hydroxy-3-isopropyl-5-tert-butylbenzyl)sulfide; bis(2-hydroxy-3-tert-butyl-5-methylbenzyl)sulfide; and bis(4-hydroxy-3,5-di-tert-butylbenzyl)sulfide.

When X is arylene, preferably p-arylene, exemplary phenols include 1,4-bis(4-hydroxy-3,5-diisopropylbenzyl)

benzene; 1,4-dis(2-hydroxy-3-tert-amyl-5-methylbenzyl) benzene, and 1,4-bis(4-hydroxy-3,5-di-tert-amyl)tetraethyl benzene. Most preferred compounds of this class are the phenylene and polyalkyl phenylene, such as the durene derivatives, particularly 1,4-bis(4-hydroxy-3,5-di-tert-butylbenzyl)durene.

Still another class of hindered phenols employed in the process of the invention are the phenols of the structure

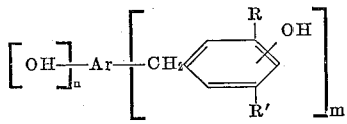

where Ar is a hydrocarbon aryl nucleus, preferably mononuclear or having up to 3 fused rings; $n$ is an integer from 0 to 1; R and R' are preferably alkyl; and $m$ is an integer from 1 to 3.

Thus, when $n$ is zero, typical hindered phenols are 1,3-5-tris(4-hydroxy-3,5-diisopropylbenzyl)benzene; 1(4-hydroxy-3,5-di-tert-butylbenzyl)naphthalene; and 9,10-bis(4-hydroxy-3,5-di-tert-butylbenzyl)anthracene. Especially preferred are derivatives of the alkylated benzene nucleus, e.g., 1,3,5-trimethyl-2,4,6-tris(4-hydroxy-3,5-di-tert-butylbenzyl)benzene.

Alternatively, when $n$ is one, the compounds are substituted phenols. Typical of such compounds are 2,4,6-tris(2-hydroxy-3,5-diisopropylbenzyl)phenol; 2,6-di(4-hydroxy-3,5-di-tert-amylbenzyl)-3,5-xylenol; 5(4-hydroxy-3,5-di-tert-butylbenzyl)-alpha-naphthol; and the like. Of these, the most preferred embodiment is 2,4,6-tris(4-hydroxy-3,5-di-tert-butylbenzyl)phenol.

These hindered phenols are, in general, white or light-colored crystalline compounds solid at room temperture. They are frequently prepared by crystallization from a solvent in which they are incompletely soluble, in order to afford a relatively pure usable solid. It has been observed, however, that when these phenols are crystallized from such a solvent, they tend to precipitate from the solution as clumps or aggregates rather than as uniform finely-divided crystals. The uniform finely divided crystalline form of the phenols is preferred because it is easier to handle, to pour, and to incorporate in foods or other substrates in controlled amount. Clumps are difficult to wash free of impurities.

It has now been found, however, that if a small amount of urea is included in the solvent, the hindered phenol crystallizes out in the preferred form of finely-divided crystals of superior uniformity, free from lumps or aggregates. Amounts of urea required for this purpose range from about 0.001% w. to about 1% w., based on the phenol. Since urea is colorless, tasteless, odorless and non-toxic, its presence in the hindered phenol does not impair the effectiveness of the phenol for its intended antioxidant applications.

Solvents suitable for use in crystallizing the hindered phenol are those inert organic liquids in which the phenol is incompletely soluble. Preferred are the hydrocarbons and halohydrocarbons. Exemplary liquids are the paraffins, particularly those from five to ten carbon atoms, such as pentane, hexane, cyclohexane, heptane, octane, isooctane and decane. Also useful are the aromatic hydrocarbons, preferably those having up to ten carbon atoms, such as benzene, toluene, xylene, ethylbenzene, and the like. Other liquids such as the haloparaffins, including chloroform and carbon tetrachloride, may also be employed.

Crystallization of the solid hindered phenol-urea compositions of the invention is readily accomplished by preparing one solution of the phenol in an appropriate solvent in suitable proportion, and another solution of urea in a solvent, the solutions being prepared at temperatures in which the solutes are readily soluble in the solvents. The two solutions are then mixed and, if necessary, the resulting mixture is cooled to a temperature at which the solutes are less soluble in the mixed solvent. In this way the solid phenol-urea mixture is readily precipitated in useful finely-divided crystalline form. In generally, it is convenient to conduct the dissolving of the hindered phenol and urea in the solvents at some temperature above about 50° C., and preferably between about 50° C. and the boiling temperature of the solvent at atmospheric pressure, and then cooling the resulting solution to some temperature below about 50° C., and preferably between about 50° C. and the freezing point of the solution in order to crystallize out the phenol composition. The crystals may then be separated from the solution by decantation, centrifugation, filtration, evaporation or other methods well known in the art. The separated crystals are then ready for drying, for further finishing, or for incorporation in the desired substrate.

As noted above, the crystallization may be carried out over a wide range of temperatures. It is, however, desirable to conduct the incorporation of the urea in the phenol under conditions such that dealkylation or other degradation of the phenol is minimized. It is therefore desirable to carry out the solution of the phenol in the solvent at a temperature below about 125° C., temperatures between about 0° C. and 125° C. being preferred for conduct of the process. The process described may be conducted at atmospheric pressure or, if desired, at higher or lower pressures, atmospheric pressure being most convenient.

While the use of urea has been found surprisingly effective in the production of uniform finely divided crystalline hindered phenol, an unexpected advantage of its use has been the stabilization it affords the resulting phenol-urea compositions. These crystalline compositions retain their light color and lack of objectionable odor for longer under conditions of use and storage than do comparable hindered phenol compositions not so stabilized.

The following examples will illustrate the novel compositions of the invention and the manner in which they may be prepared. It should be understood, however, that these examples are merely illustrative and are not to be regarded as limitations to the appended claims, since the basic teachings thereof may be varied at will, as will be understood by one skilled in the art. In the examples, the proportions are expressed in parts by weight unless otherwise noted.

Example I

A 2% solution of urea in tert. butyl alcohol was prepared by dissolving 1 g. of urea in 50 ml. of tert. butyl alcohol. An 0.8 ml. portion of this solution was added with stirring to a hot solution of 15 g. of 2,6-di-tert-butyl-4-hydroxymethylphenol in 100 ml. of cyclohexane under nitrogen, the temperature of the total solution being about 80° C.

After the mixture had been completely mixed, it was allowed to cool with stirring to room temperature. The phenol-urea mixture precipitated out as uniform finely-divided white crystals, without lumping or pilling. The crystals were recovered by filtration and washed with successive portions of cold cyclohexane.

The experiment was repeated employing 0.1 ml. of the urea-tert. butyl alcohol solution to 100 ml. of hot cyclohexane containing 15 g. of 2,6-di-tert-butyl-4-hydroxymethylphenol. Upon cooling from about 75° C., the solution gave uniform well-formed crystals of the phenol. Similar results were obtained using 0.2 ml. and 0.4 ml. of the urea-tert. butyl alcohol solution to the 15% phenol cyclohexane solution.

When the experiments were done without the urea, the crystals of 2,6-di-tert-butyl-4-hydroxymethylphenol were clumped aggregates, having a wide range of sizes and difficult to wash.

Example II

Four samples of 2,6-di-tert-butyl-4-hydroxymethylphenol compositions were kept in closed but not sealed clear glass sample vials at room temperature on a laboratory shelf for 7.5 months. At the end of that time the samples had the following appearance:

| Sample | Stabilizer | Appearance |
| --- | --- | --- |
| 1 | 0.025 percent w. citric acid | Lemon yellow. |
| 2 | 0.1 percent w. urea | No discoloration. |
| 3 | 0.0125 percent w. urea | Do. |
| 4 | None | Perceptible yellow tinge. |

Example III

To 175 ml. of a hot isooctane solution (~70° C.) containing 45 g. of bis(3,5-di-tert-butyl-4-hydroxybenzyl) ether was added with stirring 3.0 ml. of a 2% solution of urea in tertiary butyl alcohol. The resulting solution was then allowed to cool with stirring.

Upon cooling, the urea-bis(3,5-di-tert-butyl-4-hydroxybenzyl) ether composition precipitated as white uniform finely-divided crystals. The crystals were readily filtered from the liquid and air-dried.

Example IV

Using the methods of the previous examples, a solution of 1,4-bis(3,5-di-tert-butyl-4 - hydroxybenzyl)durene containing 0.01% w. of urea, based on the phenol, is crystallized from isooctane to afford a uniform finely-divided crystalline powder having enhanced stability to discoloration.

Example V

Using the methods of the previous examples, the following solid hindered phenol-urea crystalline composition are prepared:

| Hindered Phenol | Phenol Solvent | Urea Solvent | Percent w. of Urea in Phenol |
| --- | --- | --- | --- |
| Bis(3,5-di-tert-butyl-4-hydroxyphenyl) methane. | Cyclohexane | t-Butanol | 0.05 |
| 2,4,6-tris(3,5-di-tert-butyl-4-hydroxybenzyl) phenol. | 50% benzene, 50% n-heptane | Isopropanol | 0.02 |
| 1,3,5-trimethyl-tris-(3,5,di-tert-butyl-4-hydroxybenzyl)benzene. | n-Heptane | Ethanol | 0.005 |
| 9,10-bis(3,5-di-tert-butyl-4-hydroxybenzyl) anthracene. | 40% benzene, 60% isooctane | Methanol | 0.1 |
| 4,4-dihydroxy-3,3',5,5'-tetra-tert-butyl biphenol. | 60% toluene, 40% isooctane | Isobutanol | 0.01 |

Each of these compounds is obtained as a crop of clean white uniform finely divided crystals, readily washed and free from aggregation and clumping.

I claim as my invention:

1. The stabilized composition consisting essentially of a cryptophenol wherein each phenolic hydroxyl is cryptophenolic containing an amount of urea sufficient to stabilize the cryptophenol against discoloration.

2. The composition consisting essentially of an ortho-substituted cryptophenol wherein each phenolic hydroxyl is cryptophenolic, wherein the ortho substitutent upon said cryptophenol is selected from the group consisting of alkyl radicals branched on the alpha carbon atom and hydroxybenzyl groups, containing an amount of urea sufficient to stabilize the cryptophenol against discoloration.

3. The composition consisting essentially of a mononuclear di-ortho-substituted cryptophenol wherein each phenolic hydroxyl is cryptophenolic, wherein at least one of the ortho substituents upon said cryptophenol is selected from the group consisting of alkyl radicals branched on the alpha carbon atom and hydroxybenzyl groups, containing from about 0.001% w. to about 1% w. of urea.

4. The composition consisting essentially of 2,6-di-tert-butyl-4 - hydroxymethylphenol containing from about 0.001% w. to about 1% w. urea.

5. The composition consisting essentially of 2,6-di-tert-butyl-4-methylphenol containing from about 0.001% w. to about 1% w. urea.

6. The composition consisting essentially of bis(3,5-di-tert - butyl - 4 - hydroxyphenol)methane containing from about 0.001% to about 1% w. urea.

7. The process for stabilizing a cryptophenol wherein each phenolic hydroxyl is cryptophenolic which comprises crystallizing said cryptophenol from an inert organic liquid in the presence of an amount of urea sufficient to stabilize the cryptophenol against discoloration.

8. The process for stabilizing an ortho-substituted cryptophenol wherein each phenolic hydroxyl is cryptophenolic, wherein the ortho substituent on said cryptophenol is selected from the group consisting of alkyl radicals branched on the alpha carbon atom and the hydroxybenzyl group, which comprises crystallizing said cryptophenol from an inert organic liquid in the presence of an amount of urea sufficient to stabilize the cryptophenol against discoloration.

9. The process for stabilizing a mononuclear di-ortho-substituted crytophenol wherein each phenolic hydroxyl is cryptophenolic, wherein at least one of the ortho substituents on said cryptophenol is selected from the group consisting of alkyl radicals branched on the alpha carbon atom and the hydroxybenzyl group, which comprises crystallizing said cryptophenol from an inert organic liquid in the presence of about 0.001% w. to about 1% w. of urea.

10. The process for stabilizing 2,6-di-tert-butyl-4-hydroxymethylphenol which comprises crystallizing the phenol from an inert organic liquid in the presence of about 0.001% to about 1% w. of urea.

11. The process of claim 9 wherein the phenol is 2,6-di-tert-butyl-4-methylphenol.

12. The process for stabilizing bis(3,5-di-tert-butyl-4-hydroxyphenol)methane comprising crystallizing the bisphenol from an inert organic liquid in which it is incompletely soluble in the presence of about 0.001% w. to about 1% w. of urea.

References Cited by the Examiner
UNITED STATES PATENTS 2,161,772  6/1939  Carswell.
2,570,403  10/1951  Stevens et al. ____ 260—624 X
2,968,630  1/1961  Pillon et al. _____ 260—619 X

OTHER REFERENCES

Stillson et al., Jour. Amer. Chem. Soc., vol. 67 (1945), pp. 303–307 (4 pages).

LEON ZITVER, *Primary Examiner.*

CHARLES B. PARKER, HAROLD G. MOORE,
*Examiners.*